United States Patent

[11] 3,595,336

| [72] | Inventor | David J. Perez<br>1302 Knollwood Drive, Dayton, Ohio 45432 |
|---|---|---|
| [21] | Appl. No. | 859,467 |
| [22] | Filed | Sept. 19, 1969 |
| [45] | Patented | July 27, 1971 |

[54] HIGH ENERGY AIR CUSHION VEHICLE SKID BRAKE
6 Claims, 5 Drawing Figs.

[52] U.S. Cl. .................................................. 180/128, 180/116, 180/124
[51] Int. Cl. .................................................. B60v 1/16
[50] Field of Search .......................................... 180/124, 128

[56] References Cited
UNITED STATES PATENTS
| 3,414,077 | 12/1968 | Earl | 180/128 |
| 3,481,424 | 12/1969 | Barr | 180/124 |
| 3,524,517 | 8/1970 | La Fleur | 180/124 |

*Primary Examiner*—A. Harry Levy
*Attorneys*—Harry A. Herbert and Charles H. Wagner ABSTRACT: A high energy air cushion skid brake for decelerating gas cushion vehicle utilizing an air trunk (bag) design comprising means for rigidizing the air trunk structure to provide high contact skid pressure and including an expansible bellows mounted on the bottom side of the air trunk structure with friction skid brake members carried on the lower side of the bellows for ground contact with means for inflating and expanding the bellows for surface contact and including an air pervious heat shield fixed between the bellows and the skid brake member which dissipates the skid brake friction heat away from the rigidized air trunk structure when the skid brake member contacts with the ground.

PATENTED JUL 27 1971

INVENTOR.
DAVID J. PEREZ

BY
*Harry A. Herbert Jr.*

ATTORNEY

INVENTOR.
DAVID J. PEREZ
BY
Harry A. Hubert Jr.
ATTORNEY

3,595,336

HIGH ENERGY AIR CUSHION VEHICLE SKID BRAKE

BACKGROUND OF THE INVENTION

Air cushion vehicles or "ground effect" devices for vehicles and aircraft can be found in the prior art, consisting of some means for directing air jets or air forces downwardly to sustain the vehicle or craft at a desired elevation above the ground. One form is shown in U.S. Pat. No. 3,414,077 to T. D. Earl, as applied to aircraft, for "landing and takeoff," as substitutes for the conventional wheel landing gear, and comprises an inflated yieldable plenum in the form of an air cushion trunk fixed below the vehicle and a toroidal shape having a multitude of downwardly directed jet openings in the lower surface thereof and includes suitable pump means in the aircraft for supplying the trunk with sufficient air under pressure to provide the desired lift and sustaining force by jet action through the openings toward the ground or sustaining surface. Some of these air trunks or air cushions are provided with transverse friction pillows or pads for frictional ground contact during landing while the craft is moving. These friction pillows or pads project outwardly or downwardly from the bottom of the sustaining air cushion trunk members and can materially effect the "streamline" design of the trunk during forward movement or flight. Also, since the air cushion trunk members are yieldable upwardly upon ground contact they can be forced upwardly in the adjacent area of the friction skid pillows by ground contact of the pillows to the extent that some of the surrounding area of the bottom of the trunk members may contact the ground, causing excess wear, heat and damage to the bottoms of the air trunk members. Also, these friction pillows or "skid" brakes create considerable friction heat on contact with the ground which is communicated through the pillows to the supporting trunk members and can produce a detrimental effect and damage or weakness in the adjacent pillow supporting trunk portions. Another objection noted is that these transverse friction skid brake members are securely fastened directly to the bottoms of the inflated yieldable air trunks or plenum and not easily or quickly replaceable when excessively worn or damaged.

SUMMARY OF THE INVENTION

This invention is specifically designed to provide a high energy skid brake system for any air cushion vehicle using the inflatable air trunk system, including an aircraft air "ground effects" cushion takeoff and landing system, having for an object the elimination of many of the objections noted above in connection with known systems of this character. It comprises an inflatable air cushion trunk, preferably of toroid shape, for instance such as shown in U.S. Pat. No. 3,414,077 to Earl, and contemplates providing the portion of the inflatable air cushion trunk which carries the friction skid brakes with an inner inflatable flexible portion or liner which can be inflated to rigidize the skid friction brake carrying portion of the trunk, so that that portion of the trunk will not be excessively yieldable by upward pressure of the skid brakes during landing when the skid brakes engage the landing surface or ground, and also includes means for selectively applying inflation pressure into this rigidizing brake carrying portion of the cushion trunk member. The skid brake system is retractable and is mounted directly on the bottom of the air cushion trunk member below the rigidized portion. It comprises an inflatable and downwardly expansible bellows member which is suitably secured to the bottom of the trunk or trunks and includes means for inflating the bellows, and also includes the provision of air pervious insulating heat shields or layers secured to and between the lower sides of the bellow members and the friction skid blocks. The skid friction brakes or blocks are each mounted on the lower surface of the bellows. Drag links are suitably connected at one end to the front ends of the friction skid brakes or blocks and incline forwardly and upwardly, with the other link ends hingedly connected to the air trunk in front of the skid brakes or blocks. The bellows are normally held collapsed against the bottom of the air cushion trunk by any suitable means and are selectively inflated by suitable inflation means to thrust the friction skid members or blocks downwardly into operative braking position, in predetermined spaced relation below the bottom of the rigidized portion of the air trunk or plenum.

BRIEF DESCRIPTION OF THE DRAWINGS

Like reference characters refer to like parts in the several figures of the drawings in which.

DESCRIPTION OF THE PREFERRED EMBODIMENT

Figure 1:
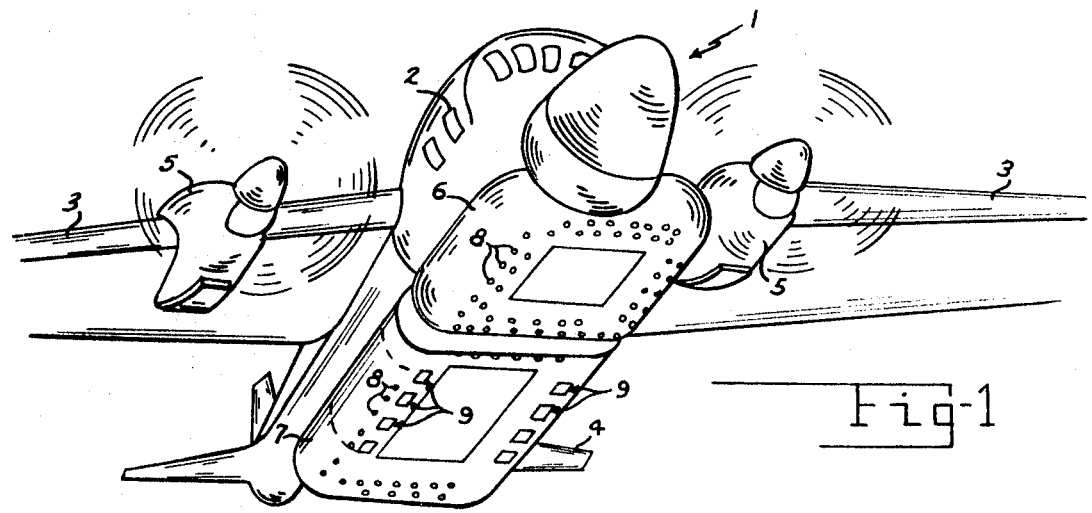
FIG. 1 is a somewhat schematic perspective view of an aircraft in flight, incorporating an inflatable air cushion "ground effect" landing gear having the invention shown thereon.
Figure 2:
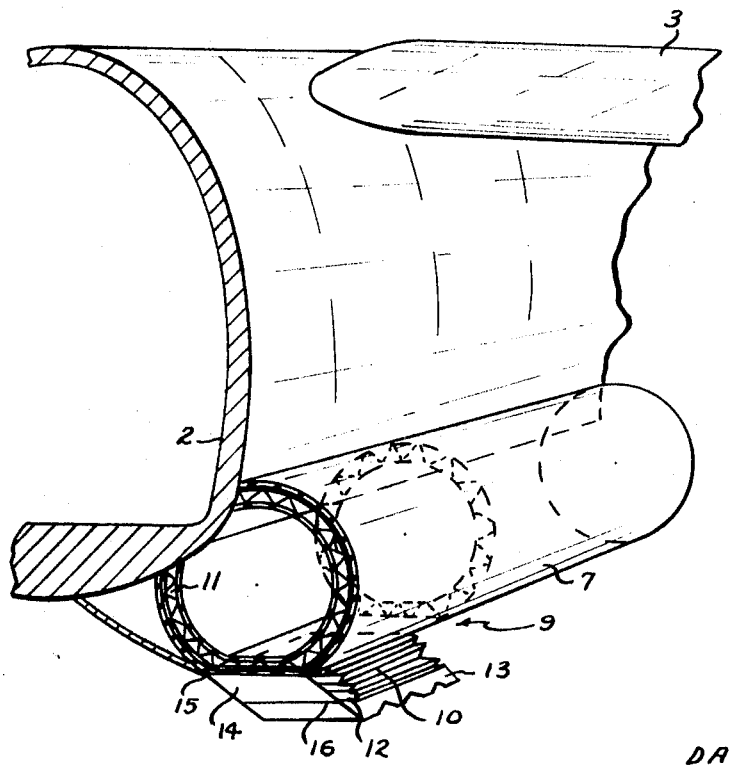
FIG. 2 is a schematic enlarged fragmental detail perspective view of a portion of an aircraft showing a portion of the air jet cushion landing gear with the extensible skid friction brakes mounted on the base of the cushion and shown in extended condition.

Referring to the drawings, and more particularly to FIG. 1, the reference numeral 1 denotes a "ground effect" air cushion support vehicle in the form of an aircraft comprising a fuselage or body 2, wings 3, elevators 4 and engines 5.

The usual wheeled takeoff and landing gear is dispensed with and an inflatable "ground effect" air cushion, trunk or plenum member is employed and indicated at 6 and 7, in this case being of toroidal form and having downwardly extending air jet openings distributed around the bottoms of the air cushions or trunks 6 and 7, as indicated at 8. In this form, the trunk members 6 and 7 may be elastic and inflatable for landing and takeoff, but contractable to lie close to the outer surface of the fuselage after takeoff, when sufficient flying speed is obtained.

The reference numeral 9 denotes generally the retractable skid friction brake means and the mounting thereof on the bottom surface of the trunks 7 as best seen in FIGS. 2 to 5.

The improved skid braking system, best illustrated schematically in FIGS. 2 to 5, comprises an expansible preferably metal rectangular bellows 10, fixed onto the lower or bottom surface of the balloonlike air trunk member 7.

The interior of the cushion or trunk portion 7, which is located above the bellows 10, is reinforced by an inner inflatable rigidizing liner 11, preferably comprising inner and outer spaced flexible layers but interconnected together by zigzag cross threads, webbing or honeycomb material, so that when inflated it produces a rigidized or stiffened area between the skid brake elements 9 and the aircraft body, with the liner 11 hugging the interior of the trunk 7 over the area.

The expansible bellows 10 as shown are preferably metal, rectangular and of the accordion type and are inflatable when it is desired to extend the bellows and force the brake shoes downwardly away from the bottom of the air cushion into surface contact braking position, but are preferably resilient and automatically collapsible upwardly against the air cushion 7 when deflated.

Secured to each of the bottoms, or lower surfaces, of the bellows 10 is a pervious heat insulating block or layer 12 of some appreciable thickness. The skid or friction brake blocks 13 are secured to or against the lower surfaces of the heat insulating layers 12, and the insulating layers or blocks 12 may be of pervious honeycomb construction to permit a cooling medium, such as air, to be circulated therethrough.

The front end portions of the skid blocks 13 are beveled upwardly and forwardly, as indicated at 13a, and connected to the bottom of the cushion or trunk 7 by drag links or plates 14 which incline upwardly and forwardly, and are respectively hingedly connected at their opposite ends to the air cushion trunk at 15 and to the brake blocks and bellows at 16.

When the brake system is not operating and no air is being supplied to the inner rigidifying structure or liner 11, the bellows 10 will collapse and the skid assembly 9 (bellows 10, heat shield 12, drag link 14 and skid material 13) will be raised to hug the contour of the trunk. This can be accomplished by either creating a negative pressure in the bellows 10 or by prestressing the molded or fabricated bellows shell 10. In the limp condition (no air being supplied) the inner structure or rigidifying liner 11 will collapse and add little, if any, to the local rigidity of the trunk structure 7, and therefore no adverse effects can be expected in the conventional air cushion incorporating the skid brakes while they are inoperative.

When the brakes are applied, air is simultaneously supplied to the inner inflatable liner structure 11, the interior of the bellows structure 10, and through the heat shield 12. The air pressure to the inner rigidifying structure or liner 11 is substantially greater than trunk air pressure and will cause the trunk, throughout the skid brake area, to become substantially rigid, thereby greatly increasing the maximum pressure that can be applied to the skid blocks 13 by the bellows 10.

The air pressure to the bellows 10 will extend the bellows and allow the skid brakes 13 to contact the ground in spaced relation to the bottom of the trunk 7 creating decelerating force. The air pervious heat shield 12 will allow the heat, generated by the skidding friction brake elements 13, to be dissipated by the insulating layer 12, instead of being absorbed by the bellows 10 and trunk structure 7.

By varying the amount of air pressure to the inner structure of the bellows 10 (by a valve connected to the pilot's brake pedal), the deceleration rate can be regulated at the pilot's discretion. The air pressure source to operate this brake system can be supplied by either bleed air from the aircraft turbines powering the air cushion 7, by an auxiliary compressor or by a high pressure tank on board the vehicle or aircraft.

Figure 3:
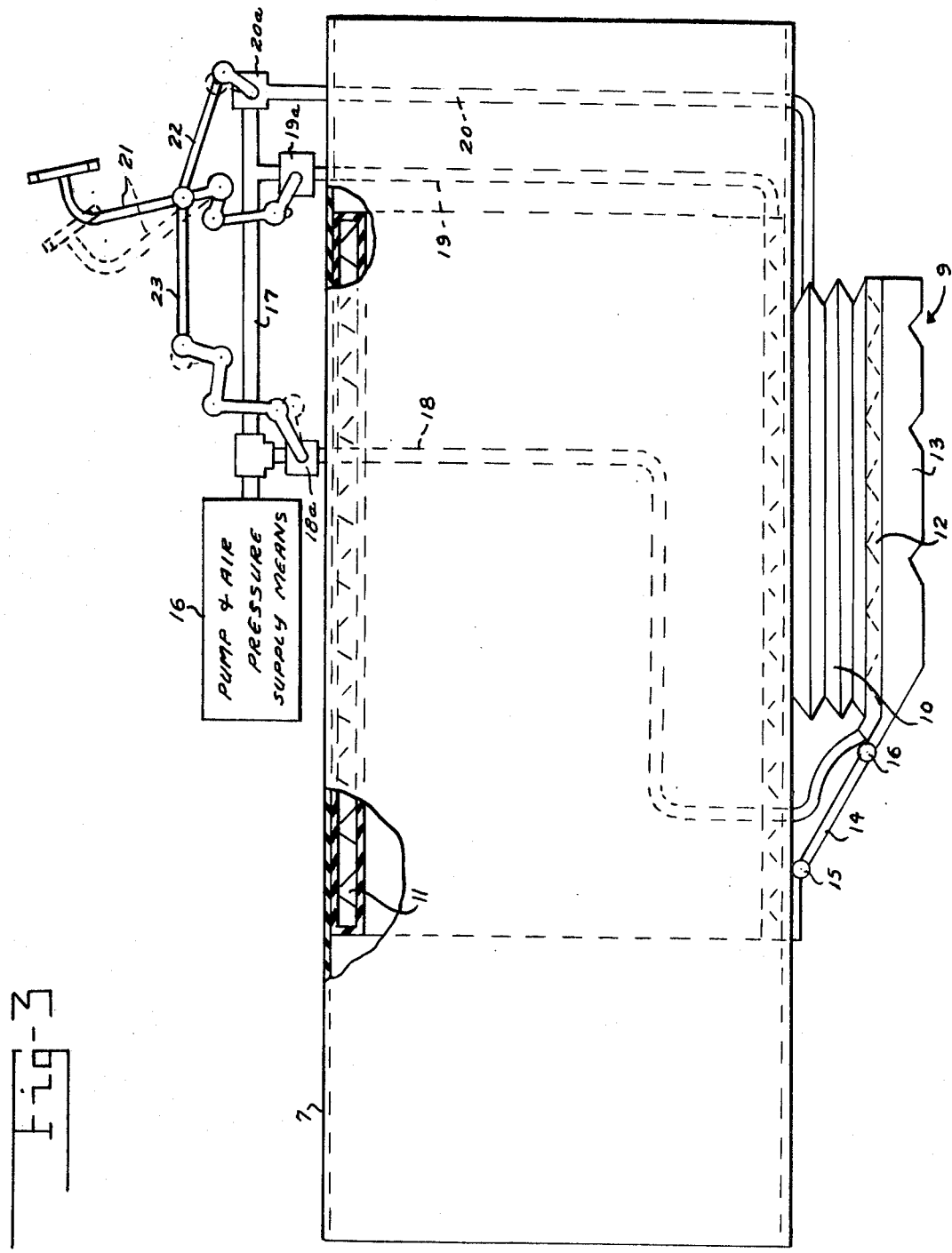
FIG. 3 is a fragmentary, somewhat schematic side view of a portion of the air cushion and more clearly depicting the rigidizing portion of the cushion with the skid brake structure of the invention shown mounted thereon in extended position, and schematically showing the inflation control means for supplying air to rigidify the portion of the cushion which supports the skid brake, and the control for extending the bellows and skid brake below the cushion, as well as control means for supplying cooling air through the pervious heat shield.
Figure 4:
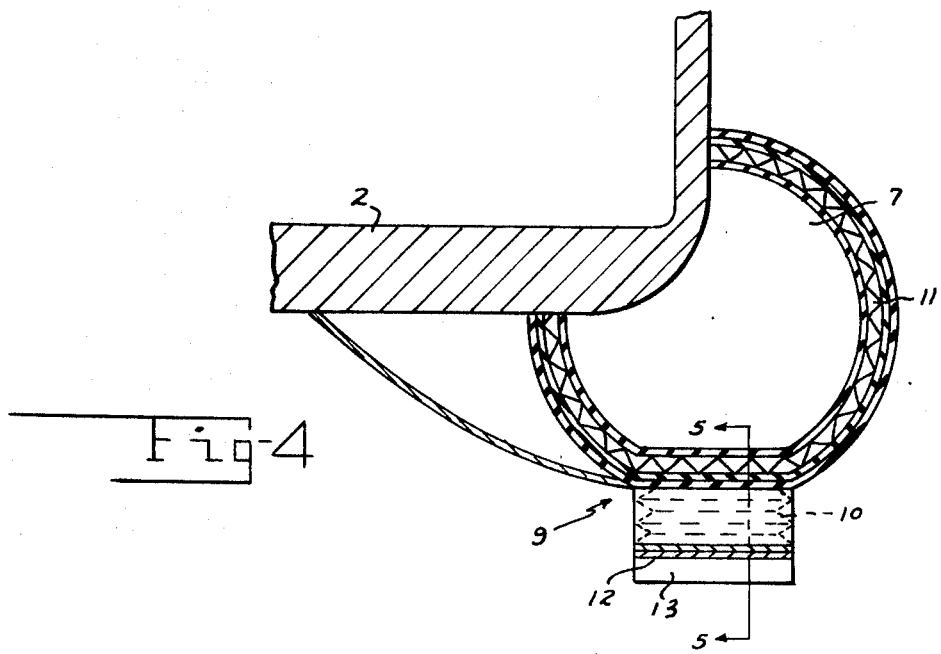
FIG. 4 is a schematic, fragmental transverse sectional view through the air cushion or trunk and a portion of the aircraft fuselage adjacent the cushion.
Figure 5:
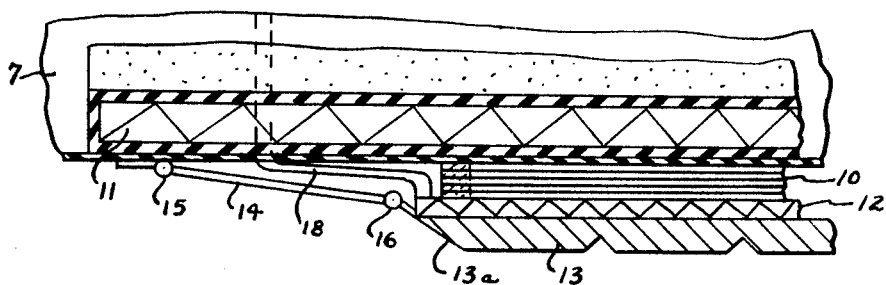
FIG. 5 is a fragmental traverse sectional view taken about on line 5-5 of FIG. 4.

Referring to FIG. 3, a schematic arrangement of one system for supplying compressed air to the liner 11, bellows 10 and heat shield 12 is in partly diagrammatic form as comprising an air pump or source of air under pressure 16, which may constitute any conventional-type of pressure tank or pump, and a pressure delivery conduit 17 interconnected with said pressure tank or pump 16 for supplying air under pressure through the series of pipes or conduits, indicated at 18, 19 and 20, respectively, to the heat dissipating honeycomb structure or layer 12, the inner rigidifying liner 11, and to the bellows 10. Each of the said conduits 18, 19 and 20 is supplied with a control and cutoff valve member, indicated respectively at 18a, 19a and 20a.

One or more of the aforementioned valves 18, 19 20 may be controlled, if desired by the pilot or operator's steering control pedal or pedals 21. A link 22, connected between the pedal 21 and valve 20a, controls the expansion and contraction of the bellows 10 for applying and withdrawing the skid brake members 13 relative to the trunk 7. A second link 23, through a bell crank, may be connected to the air circulation valve 18a to supply cooling air through the heat dissipating layer 12 when the pedal 21 is depressed to lower and apply the skid brakes 13. The valve 19a, for rigidifying the liner 11 and brake supporting portion of the air cushion 7, may be independently operated, although it is contemplated that this valve 19a may, if desired, be automatically moved to open position when the pedal 21 is depressed by the use of an actuating link between the pedal 21 and the actuating lever for the valve 19a.

For purposes of exemplification, a particular embodiment of the invention has been shown and described to the best understanding thereof. However, it will be apparent that minor changes and modifications, in the arrangement and construction of the parts thereof, may be resorted to without departing from the true spirit and scope of the invention as defined in the accompanying claims.

I claim:

1. In an air cushion outlining trunk system comprising the undercarriage component of a vehicle, adapted to be levitated in friction free relation above a reaction surface, said trunk system comprising an air inflatable balloonlike wall structure of flexible fabric having air jet openings therethrough in the bottom areas of said trunk system, the improvement comprising a plurality of downwardly extensible inflatable bellows members, skid brake elements carried by said bellows below the same for surface friction skid braking contact with a landing surface, an inflatable flexible liner within said balloonlike wall structure covering the area above said skid brake elements for rigidizing said balloonlike wall structure above said bellows and said skid brake elements, pervious heat insulating and dissipating shield members interposed between said skid brake elements and said bellows members, means for inflating said bellows members to lower said skid brake elements into spaced braking relation below the bottom of said balloonlike wall structure, and means for inflating said rigidizing liner to rigidize the area of said balloonlike wall structure which is located above said bellows members.

2. A surface-effect vehicle comprising a structure movable along a supporting surface in spaced relation thereto, an inflatable baglike flexible supporting structure for said vehicle having a front and a rear end and plurality of air jet openings therethrough in the bottom thereof opening downwardly toward said supporting surface, air pressure supply means for supplying air under pressure into said inflatable baglike flexible structure for downward discharge through said jet openings, a rigidizing flexible closed inflatable liner of predetermined length lining a portion of the inside of said inflatable baglike structure, a plurality of inflatable expansible and contractable bellows members fixed to the exterior of the lower side of said inflatable baglike structure, between the front and rear ends of said rigidifying flexible liner, a heat absorbing shield fixed on the lower side of each of said bellows members, and skid brake blocks secured in contact with the lower surface of said heat shield.

3. Apparatus as set forth in claim 2, in which a separate air supply conduit selectively supplies air to said bellows members, includes pedal control valve means in said last mentioned air supply conduit for selectively controlling and regulating air supplied to and exhausted from said bellows.

4. Apparatus as claimed in claim 3 in which said bellows members are mounted on the bottom of said baglike supporting structure in parallel spaced fore and aft extending rows at opposite sides of said inflatable baglike structure.

5. Apparatus as set forth in claim 4 in which said heat absorbing layers are air pervious and means are included for supplying air from said air supply means through said heat absorbing liners when said bellows are extended, a friction skid brake block fixed on the lower side of each of said heat absorbing layers, air supply means carried by said vehicle, including valve controlled conduits from said air supply means to said rigidifying liner and to said bellows for inflating and rigidifying said liner, and for expanding said bellows downwardly to move said friction skid brake blocks downwardly away from the bottom of said inflatable baglike supporting structure.

6. Apparatus as set forth in claim 5 including an inclined drag link member pivotally connected at one end to the front end of each of said skid brake blocks and inclining forwardly and upwardly with its opposite end hingedly connected to the bottom of said inflatable baglike structure in forwardly spaced relation to the front end of each of said skid brake blocks.